United States Patent [19]

Pace

[11] Patent Number: 5,193,037
[45] Date of Patent: Mar. 9, 1993

[54] COMPACT DISK DRIVE FOR USE WITH LAPTOP COMPUTER

[75] Inventor: Louis G. Pace, Santa Clara, Calif.

[73] Assignee: Areal Technology, Inc., San Jose, Calif.

[21] Appl. No.: 610,855

[22] Filed: Nov. 7, 1990

[51] Int. Cl.⁵ .............................................. G11B 5/55
[52] U.S. Cl. .................................................. 360/106
[58] Field of Search ........................................ 360/106

[56] References Cited

U.S. PATENT DOCUMENTS

| | | | |
|---|---|---|---|
| 4,982,300 | 1/1991 | Forbord | 360/106 |
| 4,994,931 | 2/1991 | Foote | 360/106 |
| 5,014,146 | 5/1991 | Takatsuka | 360/106 |

FOREIGN PATENT DOCUMENTS 2382743  9/1978  France .

OTHER PUBLICATIONS

Patent Abstracts of Japan, vol. 11, No. 62, Feb. 25, 1987.
Patent Abstracts of Japan, vol. 12, No. 192, Jun. 4, 1988.

*Primary Examiner*—A. J. Heinz
*Attorney, Agent, or Firm*—N. Kallman

[57] ABSTRACT

A compact disk drive includes a rotary head actuator or voice coil motor for a head arm assembly formed with flexures. The baseplate for the drive is formed with recesses to contain the voice coil motor and a lower flexure whereby the depth of the drive is reduced. The magnet housing for the voice coil motor is contoured and located in a corner of the baseplate, and the head arms are oriented so that the length of the drive is reduced.

10 Claims, 4 Drawing Sheets

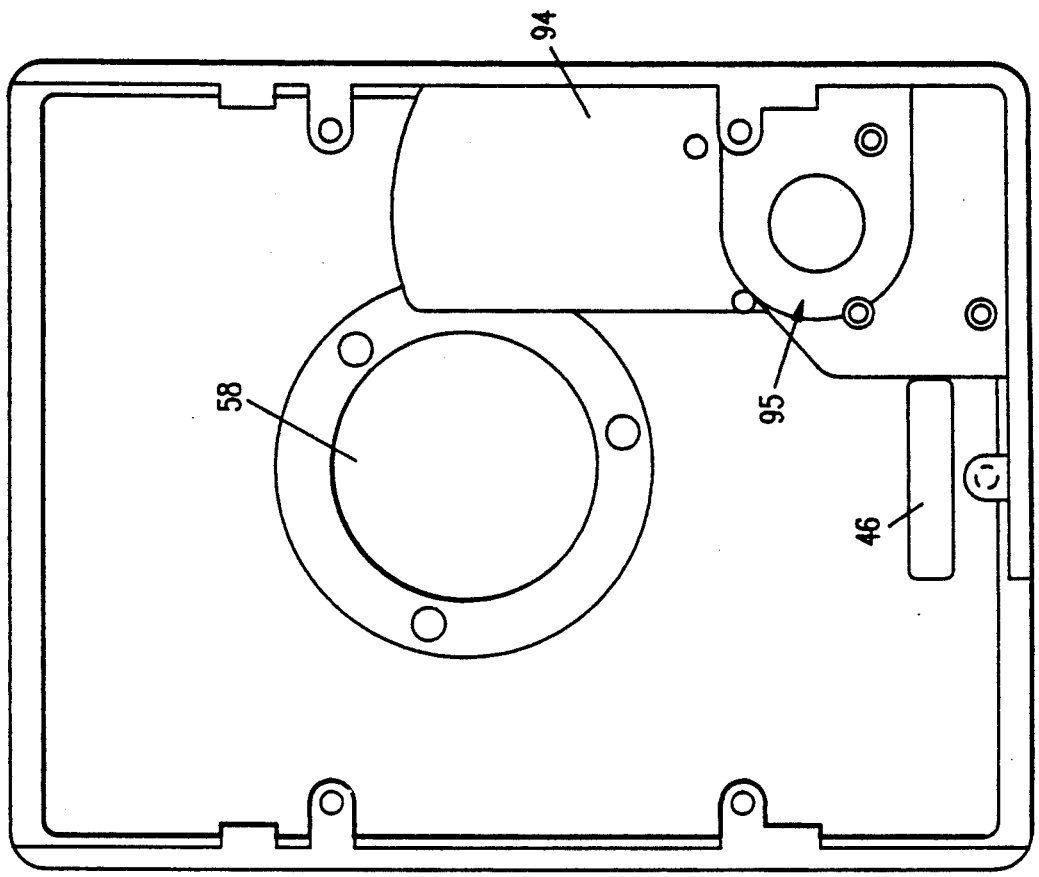
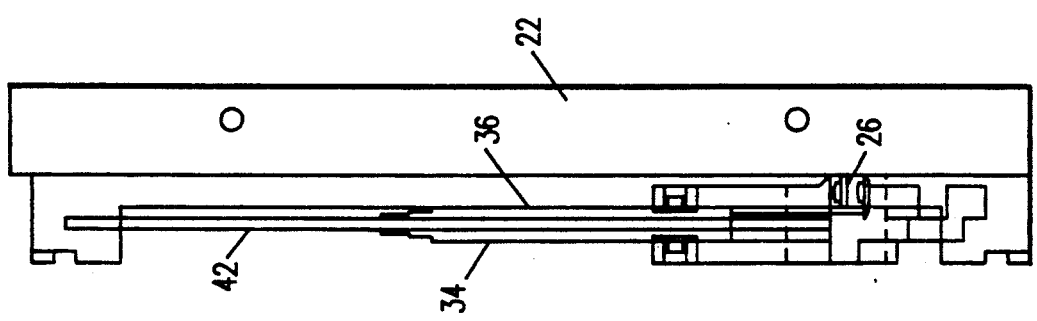

COMPACT DISK DRIVE FOR USE WITH LAPTOP COMPUTER

FIELD OF THE INVENTION

This invention relates to a compact disk drive such as used with a laptop or notebook computer.

BACKGROUND OF THE INVENTION

Description of the Prior Art

A major objective of present day data processing technology is to reduce the size and cost of systems while increasing data handling capability and reliability. Data processors or computers typically include one or more disk drives. A laptop computer which needs to be portable, and therefore compact and light in weight, generally has a single compact disk drive which comprises, inter alia, at least one magnetic disk, a drive motor, magnetic heads and a head actuator. The head actuator generally is a voice coil motor that rotates the heads to selected data tracks on the surface of the storage disk. In prior art disk drive assemblies, the form factors allowed ample length so that the voice coil motor could be large enough to meet the desired performance specifications, especially average access time. The length of the disk drive assembly is thus driven by the need for space for the voice coil motor. The voice coil motor of the head actuator uses a magnet housing which occupies substantial space in prior art disk drives. Also prior art construction employs separate components for the magnetic yoke which is susceptible to resonant vibrations at the mating surfaces. In the event of failure of the head actuator, the actuator components need to be removed and replaced separately which is time-consuming.

With the development of laptop and notebook portable computers, disk drive designs have been modified and thus deviate from conventional designs that have standard form factors. The departure from standard form factors has allowed reduction in size and weight of the disk drive. Nevertheless further reduction in size and weight is still desirable to realize the use of minimal space in a laptop or notebook computer.

Conventionally magnetic disks are made with highly polished aluminum substrates on which a thin magnetic layer is deposited. Aluminum substrates are subject to damage due to head crashes which may occur when the heads are track seeking across the surface of the disk. It is desirable to use a material for a disk substrate that provides better performance and reliability, and allows the heads to fly closer to the disk surfaces so that data density can be increased.

Known prior art disk drives generally assemble the magnetic disk to the drive motor by means of bolts or screws. This type of assembly is time consuming and requires proper alignment and is subject to tight mechanical tolerances. With the use of bolts or screws, removal and replacement of a damaged disk involves intensive labor cost and unduly long down time.

SUMMARY OF THE INVENTION

An object of this invention is to provide a compact disk drive which is significantly reduced in in overall length and depth while maintaining a relatively high level of performance.

Another object of this invention is to provide a compact disk drive having a magnetic disk that allows the heads to fly closer to the disk surfaces and affords an improved resistance to damage that may be caused by head crashes.

Another object is to provide a compact disk drive wherein resonant vibrations are minimized and higher track densities are attained.

According to this invention, the configuration of a compact disk drive affords a significant reduction in the overall length and depth of the disk drive. The disk drive comprises a magnetic disk formed with a glass substrate. The magnetic disk is seated on a spindle for rotation by a drive motor. The disk is clamped by a clamping ring to connect to the drive motor by engagement of threaded portions of the drive motor and the clamping ring. The clamping ring and housing for the motor are made of stainless steel and have a substantially similar thermal coefficient of expansion.

A rotatable head arm assembly supports at least two diverging flexures on which magnetic transducers are mounted, as is well known. The pivot point of the rotary head arm actuator or voice coil motor, to which the head assembly is coupled, is located close to a longitudinal side at the corner of a rectangular baseplate on which the drive assembly is seated. The head arm, when in home position, is aligned substantially parallel to a longitudinal side of the baseplate. This arrangement saves space that is lost with diagonal orientation of the head arm, as practised in the prior art.

An integrally formed housing for the permanent magnet of the voice coil motor, which has been formed by metal-injection molding fabrication as a one piece component, eliminates the need for separate supports for opposing plates of the magnetic yoke structure, as used in the prior art. Such supports found in prior art drives require fasteners that consume volume within the disk drive. The single piece magnet housing of this invention eliminates undesirable resonances and higher track densities are thus obtained.

In keeping with this invention, the entire actuator is disposed within a contoured recess in the baseplate. Also, the lower head arm flexure is located within a second contoured recess in the baseplate. The recesses allow the lower head flexure and the voice coil motor to be positioned in a plane below the major surface of the baseplate on which the disk drive assembly is seated. In this way, the depth of the disk drive assembly is significantly reduced.

In one embodiment, crash stops in the form of posts or screws are provided to limit the extent of travel of the rotary head arm. In an alternative embodiment, the housing for the permanent magnet of the voice coil motor, which is contoured to be reduced in size, is formed with a crash stop portion to limit the travel of the head assembly in one direction. A second crash stop, in the form of a post or projecting screw, is spaced from the crash stop formed with the magnet housing to limit the rotary motion of the head assembly in the other direction of travel.

Air flow slots are disposed at the bottom of the baseplate for cooling the drive during operation and an air filter is provided to maintain a clean ambient environment. A slot in the baseplate allows passage of the electrical cable and circuit leads from the head flexures and preamplifiers for connection to the computer and power supply so that data can be recorded on the disk and read out.

BRIEF DESCRIPTION OF THE DRAWINGS

The invention will be described in greater detail with reference to the drawings in which:

FIG. 3 is a bottom view of the drive illustrated in FIG. 2;

FIG. 4 is a side view of the disk drive, shown in FIG. 2;

DESCRIPTION OF THE PREFERRED EMBODIMENT

Figure 1:
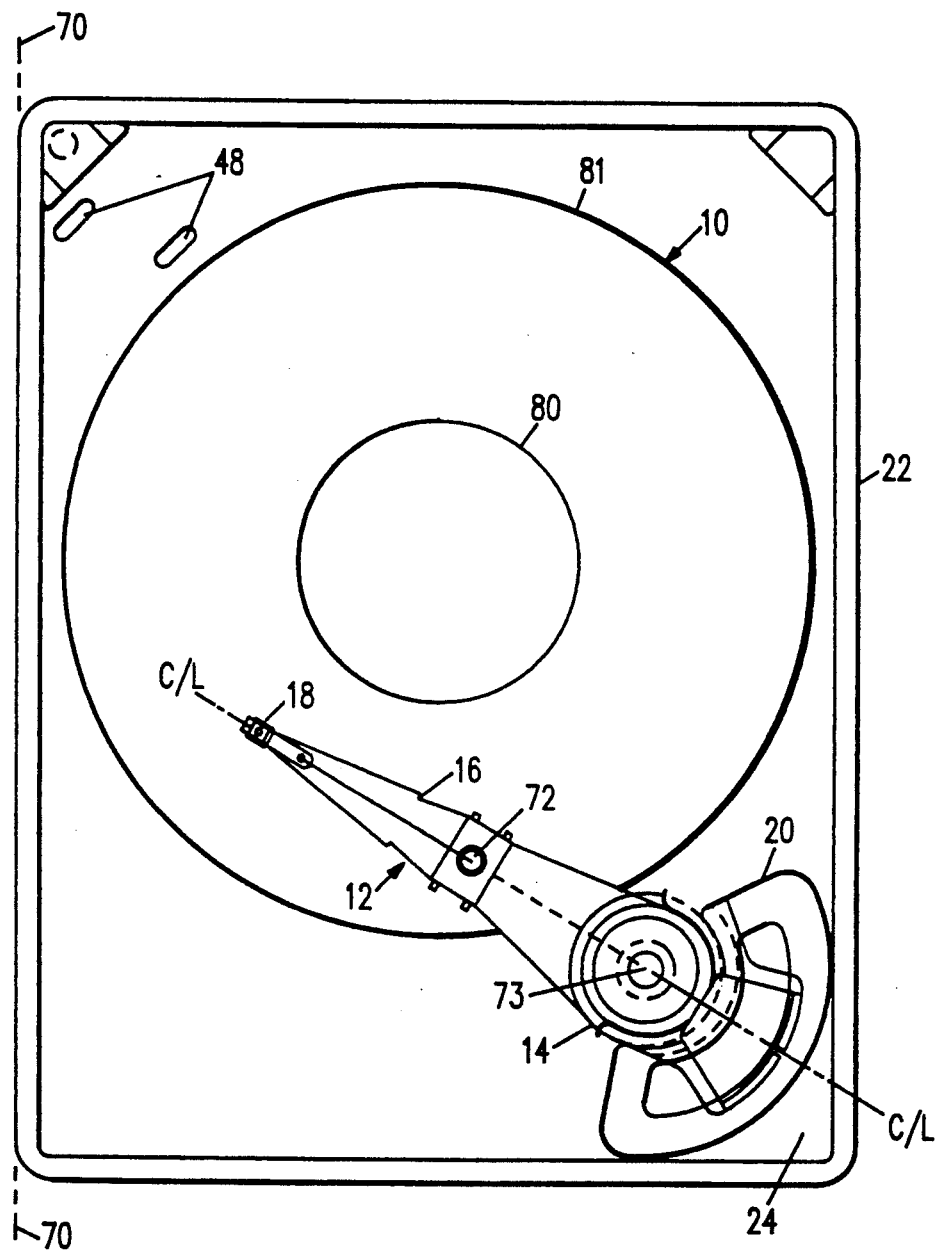
FIG. 1 is a plan view of a prior art disk drive, illustrating the relationship of the operating parts.

FIG. 1 illustrates a prior art disk drive assembly which includes a magnetic disk 10 and a head arm assembly 12 that is coupled to a rotary head actuator or voice coil motor 14. The inner diameter 80 of the disk defines the central aperture of the disk which enables seating of the disk to a motor spindle. The disk surface is disposed between the inner diameter and the outer diameter 81. The line 70 defines the longitudinal side of the baseplate 22. Air slots 48 are provided to allow air circulation. A swage hole 72 is used for attaching the head suspension and flexure 16. During operation of the disk drive, the head arm 12 turns about a pivot center 73. The head arm assembly 12 includes at least one flexure 16 and a head slider 18 which supports magnetic transducers. The actuator assembly including its magnet housing 20 is oriented so that the head arm assembly 12 is diagonally disposed relative to the rectangular geometry of the baseplate 22 on which the drive is mounted. It is apparent that an area 24 of unused space is lost in the corner of the baseplate where the actuator magnet housing 20 is located.

Figure 2:
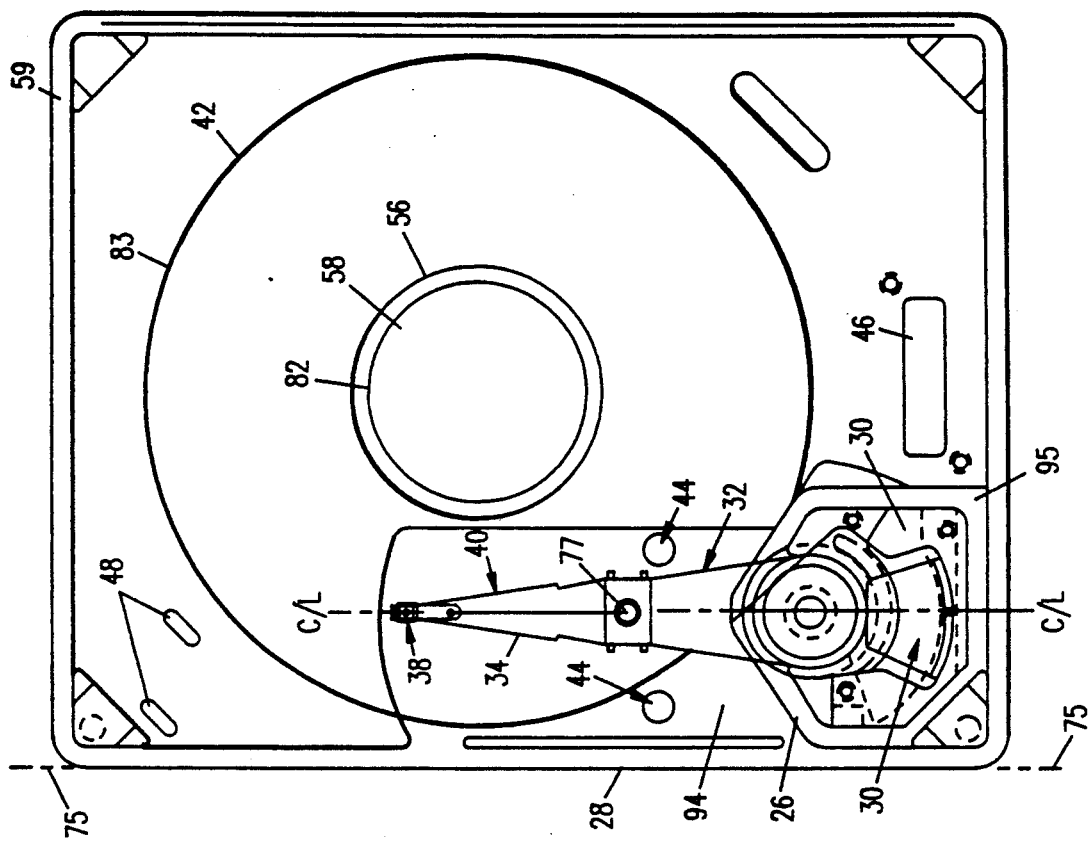
FIG. 2 is a top plan view, illustrating the novel design of a disk drive, made in accordance with this invention.
Figure 5B:
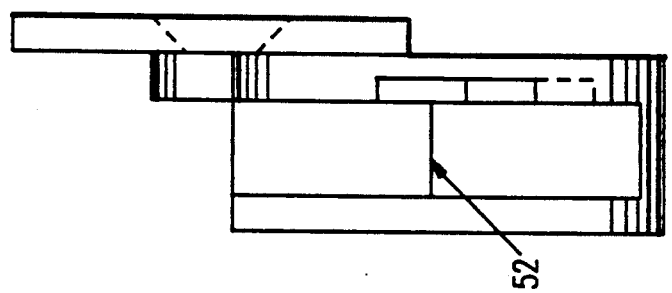
FIGS. 5A and 5B respectively are enlarged top plan and side views of the integral ball bearing pivot support of the rotary head actuator as used in this invention.
Figure 5A:
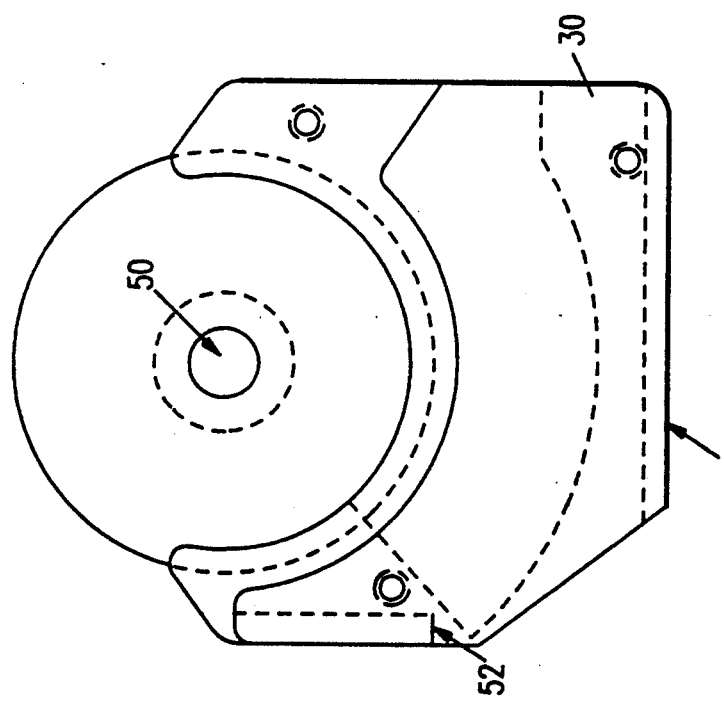

With reference to FIG. 2, the compact disk drive of this invention is illustrated wherein a rotary actuator 26 is positioned so that its pivot point is close to a longitudinal side 75 of a baseplate 28. The centerline C/L of the head arm and flexure passes through a swage hole 77. The centerline defines the longitudinal direction of the head arm and is parallel to the baseplate edge defined by the line 75. As shown in FIGS. 5A and 5B, an integral ball bearing pivot support 50 for the rotary actuator 26 is shown. The support 50 is located adjacent to a housing 30 for the magnet of the actuator 26. This design allows the removal of the entire actuator from the drive as a subassembly. Integral supports 52 are also provided for the magnetic yoke structure of the actuator. The one piece construction eliminates the need for separate supports for the opposing plates of the magnetic yoke structure, which would require fasteners that occupy space within the disk drive.

The magnet housing 30 is contoured so that the area at the corner of the baseplate 28 is occupied and effectively used. The head arm assembly 32 is mounted to the actuator 26 so that in its home position the head arm assembly 32 extends substantially parallel to the longitudinal dimension of the baseplate 28. The head assembly 12 includes an upper flexure 34 and lower flexure 36, as shown in the side view of FIG. 4. Each flexure 34 and 36 has a microslider 38 attached to a suspension 40 at the end of the flexure. The head arm is preferably made of magnesium and the suspensions 40 are relatively short so that the polar mass moment of inertia of the head actuator 26 is reduced and the volume requirement of the voice coil motor is reduced.

The magnetic disk 42 used with the disk drive of this invention is preferably made with a glass substrate on which a thin magnetic film is deposited. The relatively smooth glass disk 42 allows the head to fly closer and is more durable than the aluminum disks commonly used in terms of start-stop characteristics and shock resistance.

Figure 6:
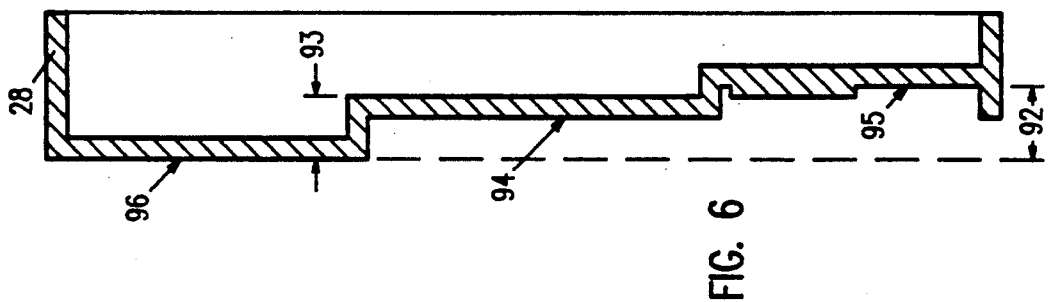
FIG. 6 is a cross-sectional view of the disk drive baseplate of FIG. 2 taken along the centerline C/L of the head arm, illustrating the physical features of the recesses formed in the drive.

The flexures 34 and 36 provide a predetermined gram load so that the heads fly at a specified height range from the recording surfaces of the magnetic disk 42, in a well known manner. One flexure 34 is disposed over an upper surface of the disk 42 and the second head flexure 36 is located below the bottom surface of the disk 42. In accordance with this invention, the lower flexure 36 is located in a recess 94 (see FIG. 6) that is formed in the baseplate 28. The lower flexure 36 and its suspension 40 and microslider 38 are thus disposed below the upper surface 96 of the baseplate 28 that faces the disk 42. In addition, the voice coil motor 26 is contained within a second recessed portion 95 of the baseplate 28. Thus a significant decrease in depth is realized by recessing these components of the compact disk drive resulting in reduced height dimensions 92 and 93. By virtue of providing the recesses, the lower flexure 36 and the voice coil motor do not project beyond the plane of the upper surface of the baseplate 28. In this manner, the depth of the disk drive can be minimized. For a disk drive employing a 2.5 inch disk, the depth of the drive assembly can be made to be about 15 mm. (millimeters) or less.

The magnet housing 30 is formed from stainless steel having a thermal coefficient of expansion substantially the same as the steel housing of the disk drive motor. Variations in ambient temperature do not adversely affect disk drive operation.

A significant reduction in the length of the disk drive is achieved by the novel arrangement of the drive motor 58 and the spindle to which the disk is mounted relative to the pivot point of the rotary head actuator. The length of the disk drive is significantly reduced by locating the pivot point of the rotary head actuator close to the corner of the baseplate, which is made possible by the contoured shape of the magnet housing 30. As a result of the design and configuration of the disk drive disclosed herein, a very compact drive assembly about 88 mm. long, 70 mm. wide and 15 mm. deep or smaller can be produced for use in a portable computer.

Crash stops 44 for the head actuator are located at the front end of the actuator adjacent to the heads, and spaced from the voice coil motor area so that space is not wasted. By mounting the voice coil motor in a contoured recess of the baseplate, space is made available for electronic components beneath the baseplate, thereby reducing the overall height of the drive.

During operation of the disk drive, the rotational speed of the disk 42 is reduced substantially from the conventional 3600 rpm whereby the heads can fly closer to the surfaces of the glass disk 42. The 2.5" disk drive disclosed herein can store more than 120 megabytes.

An aperture 46 is provided to allow making external connection with the computer electronic circuitry by the flexible electrical cable coupled to the heads and the preamplifier circuit. Air slots 48 allow air cooling and circulation through an air filter to maintain a clean environment within the drive assembly.

When assembling the disk drive components, the disk motor is securely fastened within an aperture of the baseplate with a threaded portion extending above the baseplate. After seating the magnetic disk to the motor spindle, a spacer ring is placed over the disk 42 around the extending outer threaded portion at the outer periphery. A circular clamping element 56 having a threaded portion at the inner periphery is engaged securely with the spindle by mere rotation of the clamping element. A gasket is positioned over the clamp along the periphery 59 of the baseplate 28 and a protective cover is fastened to the baseplate thereby enclosing the drive assembly, with the connection plug for transferring data signals between the head circuits and the computer exposed.

It should be understood that the invention is not limited to the use of a single disk only in a disk drive but may include two or more disks with additional magnetic heads. Other parameters including materials and dimensions than those described above may be used to implement the invention.

What is claimed is:

1. A compact disk drive comprising :
   a baseplate having a substantially rectangular configuration;
   a drive motor mounted to said baseplate;
   at least one magnetic disk having a central aperture for seating said disk to said drive motor for rotation by said drive motor; means for clamping said magnetic disk to said drive motor;
   a rotatable head arm assembly having longitudinal flexures for supporting head sliders; and
   a rotary head actuator coupled to said head assembly, including a magnet housing, said housing being contoured and disposed substantially within a corner of the rectangular baseplate, said flexures being oriented in a direction substantially parallel to the longitudinal sides of said baseplate when said head arm assembly is in home position.

2. A compact disk drive as in claim 1, wherein said clamping means comprises a clamping element having a threaded portion, said clamping element being disposed above said disk, and said drive motor having a threaded part for engagement with said threaded portion of said clamping element whereby said disk is securely seated to said drive motor for rotation.

3. A compact disk drive as in claim 1, wherein said magnetic disk is formed with a substrate made of glass.

4. A compact disk drive as in claim 1, wherein said head actuator is formed with crash stop means to limit the travel of said magnetic head arm assembly in one direction.

5. A compact disk drive as in claim 1, including an air slot formed in said baseplate for circulation of air.

6. A compact disk drive as in claim 1, including an opening in said base plate for accommodating an electrical connection between circuitry associated with said head arm assembly and external circuitry.

7. A compact disk drive assembly comprising:
   a substantially rectangular baseplate having first and second recesses formed therein;
   a drive motor fastened to said baseplate;
   at least one magnetic disk coupled to said drive motor for rotation;
   a head arm assembly positioned on said baseplate, said head assembly having upper and lower longitudinal flexures with head sliders mounted thereon, said flexures being oriented in a direction substantially parallel to the longitudinal sides of said baseplate when said head arm assembly is in home position;
   a head actuator coupled to said head assembly for transporting said head sliders to selected tracks of said magnetic disk said head actuator including a magnet housing, said housing being contoured and disposed substantially within a corner of the rectangular baseplate;
   said lower flexure and said head actuator being disposed within said first and second recesses respectively so that the depth of said disk drive is significantly reduced.

8. A compact disk drive as in claim 7, wherein said magnetic housing is contoured and formed by metal-injection-molding 9. A compact disk drive as in claim 8, wherein said housing is formed as an integral part.

10. A compact disk drive as in claim 7, including crash stops for limiting the extent of travel of said head arm assembly, said crash stops being located adjacent to said head, arm assembly and spaced from a voice coil motor in said head actuator.

* * * * *